United States Patent
van Zwol et al.

(10) Patent No.: US 10,068,178 B2
(45) Date of Patent: Sep. 4, 2018

(54) METHODS AND SYSTEM FOR ASSOCIATING LOCATIONS WITH ANNOTATIONS

(75) Inventors: Roelof van Zwol, Badalona (ES); Vanessa Murdock, Barcelona (ES); Pavel Serdyukov, The Hague (NL)

(73) Assignee: Oath, Inc., New York, NY (US)

( * ) Notice: Subject to any disclaimer, the term of this patent is extended or adjusted under 35 U.S.C. 154(b) by 1235 days.

(21) Appl. No.: 12/686,883

(22) Filed: Jan. 13, 2010

(65) Prior Publication Data

US 2011/0173150 A1   Jul. 14, 2011

(51) Int. Cl.
*G06N 7/00*   (2006.01)

(52) U.S. Cl.
CPC .................. *G06N 7/005* (2013.01)

(58) Field of Classification Search
CPC ......... G06F 17/30241; G06F 17/30244; G06F 17/30253; G06F 17/30265; G06F 17/30268
See application file for complete search history.

(56) References Cited

U.S. PATENT DOCUMENTS

| 6,572,661 B1* | 6/2003 | Stern ................ G06F 17/30014 707/E17.013 |
| 7,945,852 B1* | 5/2011 | Pilskalns ........... G06F 17/30241 715/230 |
| 2002/0010707 A1* | 1/2002 | Chang ................... G06F 17/211 715/205 |
| 2003/0083863 A1* | 5/2003 | Ringger et al. ................ 704/10 |
| 2004/0139400 A1* | 7/2004 | Allam ................... G06F 17/212 715/201 |
| 2004/0236730 A1* | 11/2004 | Frank ............................... 707/3 |
| 2005/0104976 A1* | 5/2005 | Currans ...................... 348/231.5 |
| 2005/0108213 A1* | 5/2005 | Riise et al. ....................... 707/3 |
| 2005/0192751 A1* | 9/2005 | Bresch et al. .................... 702/3 |
| 2007/0011150 A1* | 1/2007 | Frank .................. G06F 17/3087 |
| 2007/0081813 A1* | 4/2007 | Hong et al. .................... 396/310 |
| 2008/0027910 A1* | 1/2008 | Wen et al. ........................ 707/3 |
| 2008/0082463 A1* | 4/2008 | Cheng et al. ................... 706/12 |

(Continued)

OTHER PUBLICATIONS

"Methods for extracting place semantics from Flickr tags," by Rattenbury, Tye. In: ACM Transactions on the Web, vol. 3, issue 1 (Jan. 2009). Available at: ACM.*

(Continued)

*Primary Examiner* — Ashish K Thomas
*Assistant Examiner* — Mellissa M Ohba
(74) *Attorney, Agent, or Firm* — Weaver Austin Villeneuve & Sampson LLP (57) ABSTRACT

Methods, systems and computer program products for associating geographical locations with annotations corresponding to content. In one method, a language model is developed. The language model is developed from the location information and the one or more annotations associated with content uploaded by users. The language model is based on the probabilistic distribution of locations over one or more annotations. Further, when a user provides one or more annotations, the system and the method may use the language model to identify one or more locations associated with the one or more annotations provided by the user. The language model predicts one or more geographical locations based on the probabilistic distribution of locations over the annotations.

23 Claims, 6 Drawing Sheets

(56) References Cited

U.S. PATENT DOCUMENTS

| | | | |
|---|---|---|---|
| 2008/0140616 A1* | 6/2008 | Encina et al. | 707/3 |
| 2008/0189028 A1* | 8/2008 | Nair | H04W 4/02 455/456.1 |
| 2008/0243783 A1* | 10/2008 | Santi et al. | 707/3 |
| 2008/0319974 A1* | 12/2008 | Ma et al. | 707/5 |
| 2009/0144609 A1* | 6/2009 | Liang et al. | 715/230 |
| 2009/0327877 A1* | 12/2009 | Slaney et al. | 715/256 |
| 2010/0023259 A1* | 1/2010 | Krumm | G01C 21/20 701/532 |
| 2010/0082397 A1* | 4/2010 | Blegen | 705/10 |
| 2010/0103463 A1* | 4/2010 | Joshi | H04N 1/00326 358/1.16 |
| 2010/0153318 A1* | 6/2010 | Branavan et al. | 706/12 |
| 2010/0228691 A1* | 9/2010 | Yang et al. | 706/12 |
| 2010/0280985 A1* | 11/2010 | Duchon et al. | 706/52 |
| 2011/0173572 A1* | 7/2011 | van Zwol | G06N 7/005 715/856 |

OTHER PUBLICATIONS

"Resolving Tag Ambiguity," by Weinberger et al. In: Proceedings of the 16th ACM international conference on Multimedia (2008). Available at: ACM.*

"Extracting Answers from the Web Using Knowledge Annotation and Knowledge Mining Techniques," by Lin et al. In: Eleventh Text REtrieval Conference (TREC 2002). Available at: http://trec.nist.gov/pubs/trec11/t11_proceedings.html.*

"Placing Flickr Photos on a Map," by Serdyukov et al. In: Proceedings of the 32nd international ACM SIGIR conference on Research and development in information retrieval (Jun. 2009). Available at: ACM.*

"Web-a-where: Geotagging Web Content," by Amitay et al. In: SIGIR '04 (2004). Available at: ACM.*

"Geo-location Inference from Image Content and User Tags," by Gallagher et al. In: CVPR Workshops (Jun. 20-25, 2009). Available at: IEEE.*

"Generating Summaries and Visualizations for Large Collections of Geo-Referenced Photographs," by Jaffe et al. In: MIR'06 (2006). Available at: ACM.*

"Interactive Tag Maps and Tag Clouds for the Multiscale Exploration of Large Spatio-Temporal Datasets," by Slingsby et al. In: 11th Int'l Conf. Information Visualization (2007). Available at: IEEE.*

"Mining Geographic Knowledge Using Location Aware Topic Model," by Wang et al. In: GIR'07 (2006). Available at: ACM.*

"Leveraging Context to Resolve Identity in Photo Albums," by Naaman et al. In: JCDL'05 (2005). Available at: IEEE.*

"From Where to What: Metadata Sharing for Digital Photographs with Geographic Coordinates," by Naaman et al. In: Lecture Notes Comp. Sci., vol. 2888, pp. 196-217 (2008). Available at: SpringerLink.*

"Exchangeable image file format," by Wikipedia (Revision of Dec. 30, 2008). Available at: http://en.wikipedia.org/w/index.php?title=Exchangeable_image_file_format&oldid=260940647.*

Bökur Sigurbjörnsson and Roelof van Zwol, "Flickr Tag Recommendation based on Collective Knowledge", WWW 2008 / Refereed Track: Rich Media, Apr. 21-25, 2008. Beijing, China, pp. 327-336.

Morgan Ames and Mor Naaman, "Why We Tag: Motivations for Annotation in Mobile and Online Media", CHI 2007, Apr. 28-May 3, 2007, San Jose, California, USA, 10 pages.

* cited by examiner

| P(T1/L) | P(T2/L) | P((T1&T2)/L) |
|---|---|---|
| P(T1/L1) = 0.20 | P(T2/L4) = 0.22 | P(T1&T2/L1) = 0.20 × 0.18 = 0.036 |
| P(T1/L2) = 0.18 | P(T2/L1) = 0.18 | P(T1&T2/L2) = 0.18 × 0.12 = 0.0216 |
| P(T1/L3) = 0.10 | P(T2/L2) = 0.12 | P(T1&T2/L4) = 0.10 × 0.22 = 0.022 |
| P(T1/L4) = 0.10 | P(T2/L6) = 0.10 | |
| P(T1/L5) = 0.08 | P(T2/L7) = 0.09 | |

METHODS AND SYSTEM FOR ASSOCIATING LOCATIONS WITH ANNOTATIONS

TECHNICAL FIELD

The present disclosure generally relates to systems and methods for associating locations with one or more annotations provided by users.

BACKGROUND

Due to the availability of the GPS-enabled cameras and mobile phones, location metadata such as latitude and longitude information are automatically associated with various user generated content such as, but not limited to, multimedia content, text content, audio content, and visual content. The location metadata thus provides the opportunity to users to spatially organize and browse the generated content. Various network services such as, but not limited to, Google Panoramio™, Blogger™, Flickr™ and other content sharing services allow a user to share and browse the content with other users. Network services can geo-reference the generated content, with the available location metadata and thus can organize the content in an accessible taxonomy of major locations or pin-point the origin of the content on a map to identify very small regions.

However, in practice, most of the users do not own GPS enabled devices, and thus many of the user generated content are location agnostic. Moreover, in many instances, users append some identifying information with the content such as metadata, and/or one or more annotations which help in organizing and browsing the content. Still, there are cases where the content does not contain any location information. In such cases, network services allow the users to manually geo-reference the content by manually dragging the content to a particular point on the map. But, this process is time consuming and generally less accurate than the content geo-referenced through location metadata.

Some of the existing solutions provides geo-referencing to the user-generated content based on the one or more annotations provided by the user. These solutions usually involve the extraction of textual or visual features from the content which are then modeled to determine the location information. However, these solutions are limiting as they assume the prior knowledge of the location through the information appended with the content and usually limit the scaling of the map by a few location granularities. Presently, the network services lack effective methods and systems to associate one or more locations with user generated content with better accuracy.

SUMMARY

In particular embodiments, the present invention provides methods, systems and computer program products for associating geographical locations with annotations corresponding to content. In one method, a language model is developed. The language model is developed from the location information and the one or more annotations associated with content uploaded by users. The language model is based on the probabilistic distribution of locations over one or more annotations. Further, when a user provides one or more annotations, the system and the method may use the language model to identify one or more locations associated with the one or more annotations provided by the user. The language model predicts one or more geographical locations based on the probabilistic distribution of locations over the annotations.

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Example Network Environment

Figure 1:
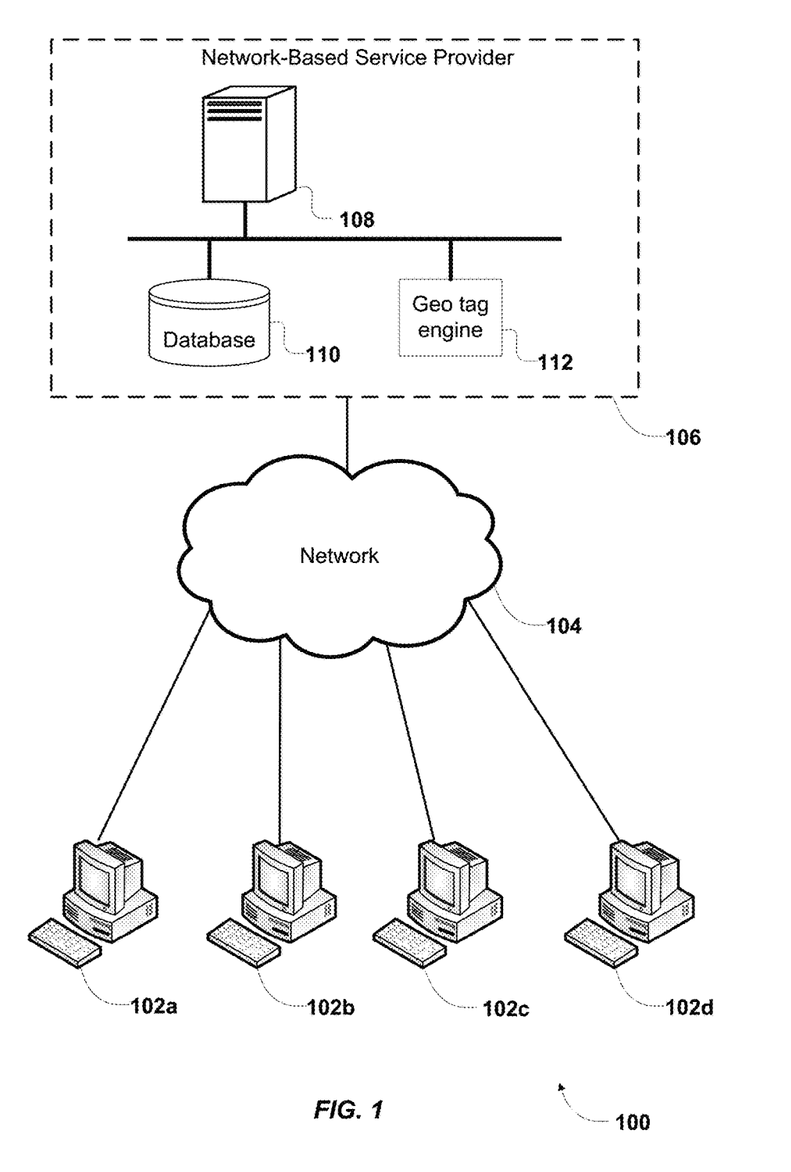
FIG. 1 illustrates an example of network environment in which particular implementations of the invention may operate.

FIG. 1 illustrates an implementation of a network environment 100 in which various implementations of the invention may be deployed, according to one embodiment. Network environment 100 includes one or more client nodes 102, a network 104, and a network-based service provider 106. Network 104 generally represents one or more interconnected networks, over which network-based service provider 106 and client nodes 102 can communicate with each other. Network 104 may include packet-based wide area networks (such as the Internet), local area networks (LAN), private networks, wireless networks, satellite networks, cellular networks, paging networks, and the like. A person skilled in the art will recognize that network 104 may also be a combination of more than one type of network. For example, network 104 may be a combination of a LAN and the Internet. In addition, network 104 may be implemented as a wired network, or a wireless network or a combination thereof. Client nodes 102 are communicatively coupled to network 104 via a network service provider or any other suitable methods known in the art.

Client Nodes

Client nodes 102 are computing devices from which a user accesses the services provided by network-based service provider 106. Client node 102 has the capability to communicate over network 104. Client node 102 further has the capability to provide the user an interface to interact with the service provided by network-based service provider 106. Client node 102 may be, for example, a desktop computer, a laptop computer, a mobile phone, a personal digital assistant, and the like. A client node may execute one or more client applications such as, without limitation, a web browser to access and view content over a computer network, an email client to send and receive emails and an instant messaging client for communicating with other users. Client nodes 102, in various embodiments, may include a Wireless Application Protocol (WAP) browser or other wireless or mobile device protocol suites such as, without limitation, NTT DoCoMo's i-mode wireless network service protocol suites, EDGE, and the like.

Network-Based Service Provider

Network-based service provider 106 is a network addressable system that hosts a network application accessible to one or more users over network 104. The network application may provide means for users to connect with each other through social ties or any other common attributes. The network application may be an email service, a social or a business network, a blog service, an online forum, a wiki service, a content aggregation and/or distribution service or any other network application where at least part of the content is annotated and/or generated by users. The user generated content includes, without limitation, multimedia content, audio content, visual content, text content and the like. Some examples of such services are, but not limited to, Panoramio™, Flickr™, Answers™, Blogger™, Orkut™ and Twitter™. In various embodiments of the present invention, network-based service provider 106 includes an application server 108, a database 110 and a geo tag engine 112. Further, it should be understood that database 110 may be any source of information such as a hosting service or remote database, and network-based service provider 106 can either be connected directly thereto or through network 104. In an embodiment of the invention, database 110 may be associated with a content storage server.

Application server 108 provides a user access to database 110 and network applications over network 104. More specifically, user executes a client application and accesses one or more network applications provided by network-based service provider 106. Further, user may access the content stored in database 110 via network applications. Additionally, application server may employ a user authentication system such as a login and a password to provide access to the content stored in database 110.

Database 110 stores the content generated by users of a network application hosted by network-based service provider 106. Database 110, without limitation, may include information which is accessible or viewable by the users of the network application or service. Content stored in database 110 includes content such as, but not limited to, multimedia content, audio content, text content, visual content and the like. Further, the user may append one or more annotations, and/or location metadata associated with the content in database 110. Annotations may include, but not limited to, one or more tags, a title, a description, creator, comments and the like. Additionally, the content may also include annotations embedded by various digital devices. For example, a digital camera may embed various annotations in the picture. The various annotations may represent time of capture, aperture, shutter speed, location metadata and the like. Such annotations may be extracted, for example, from the EXIF (Exchangeable Image File) header, or from the IPTC (International Press Telecommunications Council) header stored inside the digital file of the picture by various photograph management and organization software packages. In various embodiments of the present invention, the user may also edit the annotations associated with a particular content at any give time.

Geo tag engine 112 utilizes the information stored in database 110 to develop a language model. Geo tag engine 112 utilizes the various annotations and location metadata associated with one or more content to develop the language model. The language model can further predict the association of one or more locations with a given set of annotations, based on a probabilistic distribution of locations over the annotations.

Figure 2:
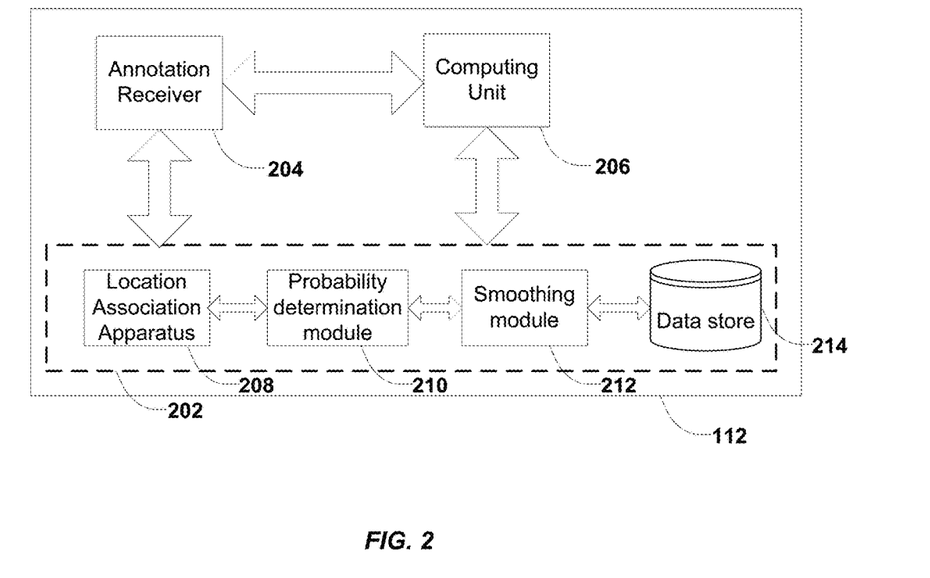
FIG. 2 is a block diagram of geo tag engine in an example embodiment of the present invention.

FIG. 2 illustrates geo tag engine 112, according to one embodiment of the invention. Geo tag engine 112 includes a language model 202, an annotation receiver 204 and a computing unit 206. In an embodiment of the invention, users upload one or more user-generated content in the network application provided by network-based service provider 106. Users may associate one or more annotations with the content. The annotations may include, with out limitation, one or more tags, a title, a description, creator, comments and the like. Additionally, the content may also include annotations embedded by various digital devices. In an embodiment of the invention, the user generated content and the associated annotations are stored in database 110. Moreover, in some cases, the content also includes an associated location metadata, such as latitude and longitude information.

In an embodiment of the invention, geo tag engine 112 utilizes the information stored in database 110 to develop language model 202. For this purpose, content stored in database 110 may be divided into two categories: a) content with one or more annotations and associated location metadata and b) content with one or more annotations but no location metadata. The content with one or more annotations and associated location metadata is interchangeably referred to as a training data set. In an embodiment of the present invention, each content present in the training data set is associated with the following attributes: a content identification, a location metadata, and one or more annotations. Content identification is a unique identifier associated with content. In an embodiment of the invention, location metadata associated with the content is latitude and longitude coordinates of a location, or other geo-location information formatted according to an alternative geographic coordinate scheme. The training data set is utilized by geo tag engine 112 to develop language model 202.

Referring now to FIG. 2, language model 202 may include a location association apparatus 208, a probability determination module 210, a smoothing module 212 and a data store 214. In an embodiment of the present invention, location association apparatus 208 accesses the location metadata of the training data set from database 110. Since, the training data set has content associated with one and more annotations, and specific location metadata, location association apparatus 208 uses the latitude and longitude coordinates (location metadata) to represent a location on the world map. Subsequently, location association apparatus 208 associates the represented location with corresponding annotations to generate a language representation of each location.

Representation of Locations on the Map

In an embodiment of the present invention, for representing locations on a map, an m×n grid is constructed on the world map. The grid construction is based on the latitude and longitude coordinates of the globe, where each cell within the grid represents a location on the world map. In an exemplary embodiment, a location on the world map is described by a pair of universal geographical coordinates (UGC). UGC coordinates represents the latitude and longitude coordinates in the form of decimal numbers. Each pair of coordinates, ignoring the decimal part and considering only degree units, defines a unique location such as an approximate rectangle, or a cell of the grid with longitude size of about 111 kilometers long and variable latitude size. In an embodiment of the present invention, if the length of latitude varies from 0 kilometers at the poles to 111 kilometers at the equator, various divisions of grid cells such as grid cell of size 1, 5, 10, 50 and 100 kilometers are considered for representing locations. Thus, for a particular grid cell division, a location can be mapped to its corresponding grid cell on the world map by using the latitude and longitude coordinates of the location. In an embodiment of the present invention, location association apparatus 208 maps the location metadata of each content present in the training data set with the corresponding grid cell, to associate a location with content.

In one embodiment of the present invention, annotations associated with the geographical locations on the world map are enriched by using external sources of information such as gazetteers and Geonames. Information obtained from external sources may be associated, similar to one or more annotations, with the locations, thereby enriching the annotations associated with the locations. Furthermore, external sources such as gazetteers and Geonames, act as an authentic and reliable source of information about the geographical locations. Gazetteer and Geonames are some of the examples of the external databases which contain descriptions of various places and locations in the world. A person who is ordinarily skilled in the art can understand that the above examples are for exemplary purposes only and do not limit the scope of the present invention.

In an embodiment of the present invention, location association apparatus 208 may associate one or more annotations of various contents in the training data set to the corresponding location on the grid cell. Further, the sources of annotations may be augmented by the text or description or various other annotations received from the external sources of information. The annotations associated with the locations are utilized to derive a language representation of the location. In an embodiment of the invention, if more than one content is mapped to the same cell of the grid structure, then annotations associated with all of these content are grouped together to form a set of annotations for that particular location, represented by that cell. Thus, a set of annotations is generated for each location represented by the grid cell on the world map.

In an embodiment of the present invention, content in the training data set may be associated with location agnostic annotations (such as "garden"). The location agnostic annotations are not used for deriving the language representation of locations. Location association apparatus 208 samples the annotations associated with one or more contents to identify location agnostic annotations. Further, location association apparatus 208 may also perform standard annotation normalization in which all terms in compound annotations are concatenated and all special characters are removed.

Locations as a Graph

In an embodiment of the present invention, for representing locations in a graph, the grid cell structure underlying the collection of locations implies a spatial relationship. For example, the links between a pair of locations, represented by grid cells, exist only if they are situated close enough on the grid. In an example embodiment of the invention, cell-based distance may be used to determine the closeness of the cells. For example, the grid structure may have 8 cells situated within 1-cell distance or 24 cells situated within 2-cell distance, etc. Thus, locations which are found within a predefined distance may be linked and considered as neighbors. Further, linked locations may have high probability to be represented by similar annotations.

Probabilistic Distribution of Locations Over Annotations

The representation of locations developed by location association apparatus 208 is utilized by probability determination module 210 to determine the probability distribution of locations over the annotations. The probability determination module 210 determines, for each location, the probability of an annotation being present in the set of annotations associated with the location. The set of probability values thus generated represents the probability distribution of locations over the annotation. This process is repeated for each annotation to determine probability distribution of locations over the annotations. The probability distribution of locations over the annotations is represented by P (T|L), where T is a set of annotations T={$t_1, t_2, \ldots t_i$} and L is the set of locations containing all the locations on the world map. In one embodiment, each annotation $t_i$ present in the set T is generated independently, thus $$P(T|L) = \prod_{i=1}^{|T|} P(t_i|L) \quad (1)$$

Further, the probability distribution of locations for each annotation (i.e. $P(t_i|L)$) computed by probability determination module 210 is stored in data store 214. In one embodiment, data store 214 may be dynamically updated when a user uploads content with associated location metadata and annotations.

In some cases, the probability distribution of locations computed by probability determination module 210 may suffer from the problem of data sparseness or that the annotations indicate an area that exceeds the bounds of a location. For example, some annotations specify a large area such as a country or a continent, which may be larger than the largest grid cell used in the representation of locations. Moreover, some content and related annotations may be associated with several locations on the grid thereby exceeding the bounds of specific location. In some embodiments, the probability distribution of locations over the annotations may be smoothed using smoothing module 212 prior to storage in data store 214. Various methods have been described in the following embodiments of the present invention for smoothing the obtained probability distribution.

Annotation Based Smoothing with Neighbors

Due to the problem of data sparseness, probability distribution of locations over the annotations may not contain probability values for each location. Thus, based on the annotations associated with the locations in the spatial neighborhood, the probability distribution of locations over the annotations is smoothed. In one embodiment, each annotation found within a specific location is generated by either language model of the location, or by language models of neighboring locations, thus the annotation likelihood (the probability of an annotation given a location expressed as P(t|L)) can be calculated by the equation:

$$P(t|L) = \mu \frac{|L| \cdot P(t|L)_{ML}}{|L| + \lambda} + (1-\mu)P(t|NB(L)) + \frac{\lambda \cdot P(t|G)_{ML}}{|L| + \lambda} \quad (2)$$

-continued $$P(t\mid NB(L)) = \sum_{L'\in NB(L)} \frac{|L'|}{|L'|+\lambda} \frac{P(t\mid L')_{ML}}{(2d+1)^2 - 1} \quad (3)$$

where P(t|G) is the maximum likelihood probability of an annotation being generated by a general model of locations, and λ and μ are parameter that controls the smoothing to prevent zero probabilities for annotations not present in the data store 214, The neighborhood of locations, NB(L), consists of all locations, L', within distance d (in grid cells) of location L to be connected on the grid.

Smoothing Cell Relevance Probabilities

In another embodiment, cell based smoothing is used to smooth a grid cell from its neighborhood locations. In this method, cell relevance propagates through the links between locations which are close on the grid structure. Using this, a weighted in-degree approach is used to calculate the probability to generate the annotation set T of a certain location by adding the probabilities of neighborhood locations $$P(T\mid L) = \mu \cdot P(T\mid L) + (1-\mu) \sum_{L'\in NB(L)} \frac{P(T\mid L')}{(2d+1)^2 - 1} \quad (4)$$

Further, some neighbors are selected to propagate cell relevance based on one or more predefined criteria. In one embodiment, only those neighborhood locations are selected for propagating cell relevance which have lower probability that the location to be smoothed. Thus, best location within a certain neighborhood is not selected but the locally relevant locations from different parts of the globe are considered for selecting the locations for propagating cell relevance. Accordingly, locations are represented in a directed grid graph and only some selected neighbors satisfying a predefined criterion are used for calculating weighted in-degree. In graph-related terms, the grid graph is dependent on the annotations entered by users, and edges between cells are directed from lower probability scored cells to higher probability scored cells.

Boosting Geo-related Annotations

In yet another embodiment, an external database of locations is used to incorporate geographical information about geo-related annotations. In some cases, users annotate content with annotations that can be easily recognized as location specific such as names of places (e.g. cities or countries), points-of-interest (e.g. monuments, stadiums, hotels, or bars) or events specific to certain locations (e.g. festivals, sport competitions). A boosting approach defined by the following equation is used to introduce preliminary knowledge about annotations into the developed model.

$$P^{new}(t\mid L)_{ML} = P(t\mid L)_{ML} \frac{1 + \beta \cdot P(Loc\mid t)}{Z} \quad (5)$$

where P(Loc|t) is a probability of the annotation t to be location specific, β is a boosting coefficient, Z is a normalization constant, and P(t|L)$_{ML}$ is defined as in equation 2.

For example, an external database of locations such as GeoNames may be used to identify location specific annotations. GeoNames is a geographical database integrating geographical data such as names of places in various languages, elevation, population and other data from various sources. The list of toponyms limited to English names of populated locations is used for identifying location specific annotations. For all annotations that are present in the list, P (Loc|t) equals 1.0 and otherwise equals 0.

Spatial Ambiguity-aware Smoothing

In yet another embodiment, spatial ambiguity of an annotation is incorporated in language model 202 for cases where annotations are specific to more than one location Annotations can be specific to more than one location either because their scope exceeds the bounds of a single cell or due to their ambiguity (for example bath and Bath, UK) or because they are instances that are typically spotted at a few specific locations, such as elephants. For smoothing purposes, annotations that are highly spatially ambiguous are often better than those having a single geographical focus. As the latitude and longitude coordinates of all annotations are known in the training data set, spatial ambiguity of an annotation is characterized by the standard deviation of its latitudes and longitudes $\sigma_{lat}$, $\sigma_{lon}$. This can be incorporated in the developed language model 202 by using the smoothing coefficient λ discussed earlier, in equation 3. In this case, smoothing coefficient λ is annotation specific and proportional to the ambiguity of an annotation.

$$\lambda(t) = \lambda + \gamma(\sigma_{lat}(t) + \sigma_{lon}(t)) \quad (6)$$

Thus, individually generated probabilities of ambiguous annotations are used for finding the most probable location for a set of annotations. Also, it helps in preventing over-boosting of ambiguous annotations.

As described above, various methods of smoothing may be incorporated in smoothing module 212 to smooth the probability distribution of locations. Further, in various embodiments, the probability distribution obtained after the smoothing may be stored in data store 214. In one embodiment, language model 202 develops itself by using the content uploaded by the users. For example, language model 202 utilizes the various content and associated annotations and location metadata to identify a plurality of beach locations present in the world. When a user uploads content and provides "beach" as an annotation, language model 202 accordingly modifies the probability distribution of locations over the annotation "beach". Thus, language model 202 develops itself by learning through the various content and associated annotations provided by the user.

Utilization of Language Model to Identify Locations Corresponding to Annotations In one embodiment, language model 202 developed by utilizing the content present in the training data set is used by geo tag engine 112 to identify the geographical locations associated with the annotations received from a user Annotation receiver 204 receives the annotations provided by the user. In one embodiment, annotations received from the user are associated with content. More specifically, when a user uploads content by accessing the network application hosted by network-based service provider 106, various annotations are attached by the user to provide more information about the content. In another embodiment, annotations received from the user are one or more keywords of a query entered by the user.

Computing unit 206 obtains probability data corresponding to the annotations received by annotation receiver 204 by utilizing language model 202. More specifically, computing unit 206 obtains a probability distribution of locations corresponding to the received annotations from data store 214. Computing unit 206 utilizes the probability data to generate a set of probable locations associated with the received annotations Given a set of annotations associated with a content, a set of locations are predicted where the content might have been generated based on a probabilistic analysis. In other words, a rank list of locations L, ordered by the descending probability for a given set of annotations T belonging to the content, taken within the bounds of L is generated by the equation:

$$P(L|T) = \frac{P(T|L)P(L)}{P(T)} \quad (7)$$

where P(L|T) represents the probability of the locations L for the set of annotations T. In one embodiment, a multinomial probability distribution over the annotations is used to represent the locations. In various embodiments, probability of locations P(L) and probability of annotations P(T) may not influence the ranking of locations. The rank list of locations for the given set of annotations (i.e. P(L|T)) is obtained by computing the probability of the given set of annotations at the locations (i.e. P(T|L)). Thus, locations are ranked by the probability to generate the set of annotations supplied by the user. If each annotation $t_i$ in the set T is generated independently, the annotation set likelihood can be calculated by the equation:

$$P(t|L) = \frac{|L|}{|L|+\lambda}P(t|L)_{ML} + \frac{\lambda}{|L|+\lambda}P(t|G)_{ML} \quad (8)$$

where $P(t|L)_{ML}$ and $P(t|G)_{ML}$ are maximum likelihood estimates of annotation generation probabilities for the language model of the location and the general language models respectively, |L| is the size of the location L in annotations and λ is the parameter of smoothing. In an example embodiment of the present invention, Dirichlet smoothing may be used for better estimation of probabilities.

Figure 3:
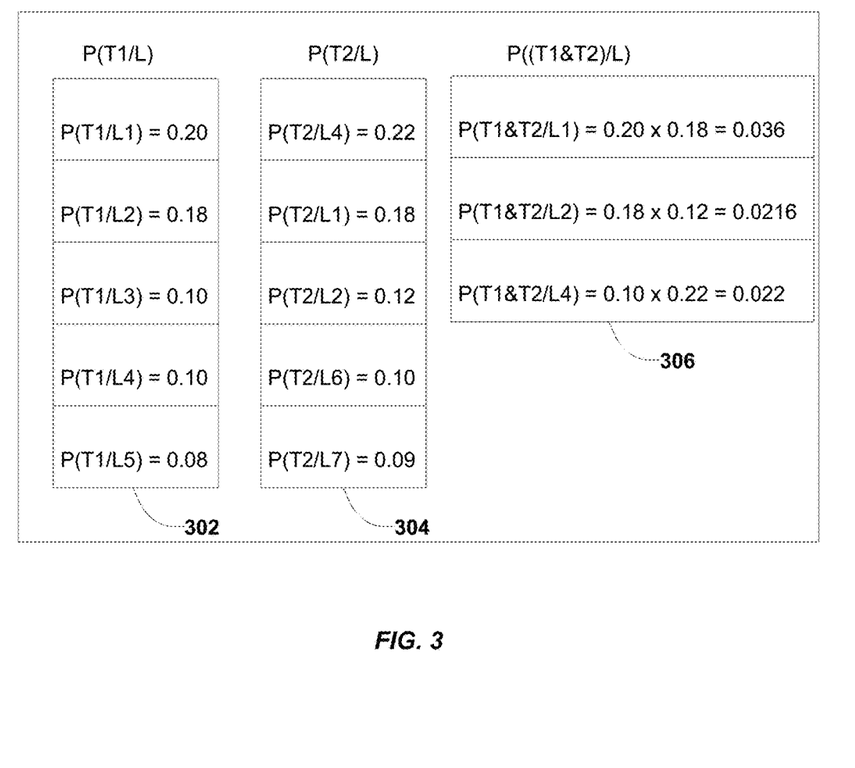
FIG. 3 illustrates an example embodiment of the present invention to identify a set of locations associated with one or more annotations.

FIG. 3 illustrates an example embodiment of the present invention in which a set of locations is identified based on the one or more annotations received from the user. Consider a user who has uploaded a photograph and has associated a set of annotations T={T1, T2} with the photograph Annotation receiver 204 receives the annotations provided by the user. Now, computing unit 206 obtains the probability distribution of locations for the two annotations from language model 202. In one embodiment, language model 202 performs real-time calculation of the probability distribution of locations for the received annotations. In another embodiment, probability distribution of locations over various annotations is already stored in data store 214, which is a part of language model 202. Referring to FIG. 3, table 302 and table 304 contains the probability distribution of locations corresponding to the annotations T1 and T2 respectively. In this example, P(T|L) represents the probability that the annotation T belongs to the set of annotations associated with the location L. Table 302 shows the probability scores for the top 5 locations {L1, L2, L3, L4, L5} arranged in the descending order of probability scores. These locations are identified based on their probabilities of being associated with the annotation T1. Similarly, table 304 shows the probability scores for the top 5 locations {L4, L1, L2, L6, L7} arranged in the descending order of probability scores. These locations are identified based on their probabilities of being associated with the annotation T2. In this example, only top five locations are considered for further probability calculations.

Computing unit 206 utilizes the probability distribution of locations obtained from language model 202 for further calculations. Table 306 lists the final probability scores of the locations for the two annotations calculated by computing unit 206 where P(T|L) represents the probability that both the annotations T1 and T2 correspond to the location L. In one embodiment, each annotation present in the set of annotations associated with a location is generated independently; thus, P(T|L) can be obtained by multiplication of P(T1|L) and P(T2|L). In one embodiment of the present invention, the computing unit 206 generates a rank list of locations, ordered by the descending probability for a given set of annotations. The rank list of locations for the two given annotations T1 and T2 is represented by P(L|T). Referring to equation 7, as P(L) and P(T) does not affect the rank list of the locations, hence P(L|T) bears the same ranking as P(T|L). In this example, the rank list contains {L1, L4, L2} with L1 having the highest probability of being associated with the annotations T1 and T2.

Figure 4:
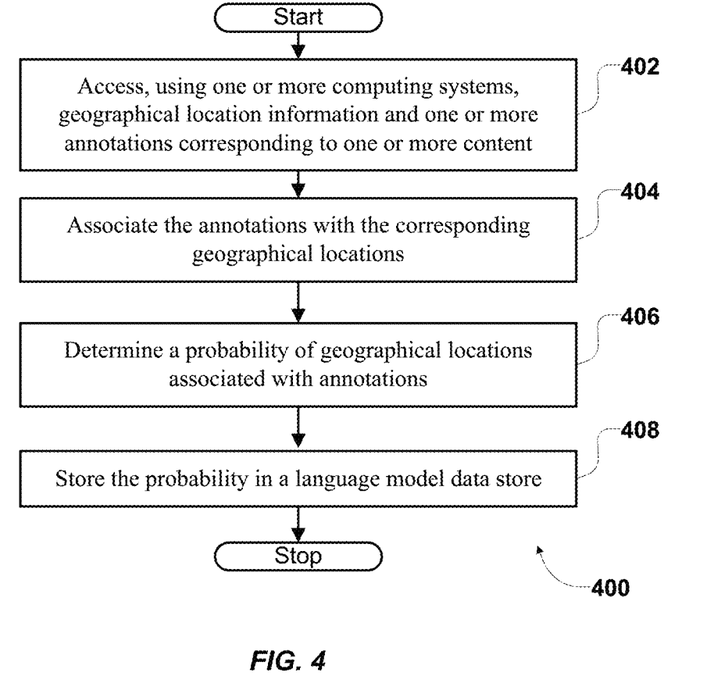
FIG. 4 is a flowchart illustrating an example method for developing a language model.

FIG. 4 illustrates flowchart 400 summarizing various steps involved in an example embodiment of the invention. At step 402, location association apparatus 208 access content with associated location metadata and various annotations, from a training data set, which may be available in a database 110. In one embodiment, database 110 provides the content with associated location metadata and annotations. In another embodiment, a user provides the content with associated location metadata and annotations. The content uploaded by the user includes, without limitation, multimedia content, visual content, audio content, text content. In various embodiments, annotations may take the form of one or more tags associated to the content. Other types of annotations include, e.g., a title, a description, creator, and comments. In one embodiment, the location metadata associated with the content is the latitude and longitude coordinates of the location.

At step 404, the location metadata received in the step 402 is utilized to identify the corresponding location on a world map. In one embodiment, an m×n grid is constructed on the world map. The grid construction is based on the latitude and longitude coordinates of the globe, where each cell within the grid represents a location on the world map. Further, the annotations received in the step 402 are associated with the identified location on the world map. If more than one content is associated with the same location on the map then, annotations associated with all of the content are grouped together to form a set of annotations. Thus, locations on the grid are represented by sets of annotations. In one embodiment, external sources of information such as gazetteers and Geonames, are used to obtain more information about the locations. The information obtained from the external sources is used to enrich the annotations associated with the location. Thus, language representation of each location is derived by using the set of annotations associated with the location.

At step 406, probability determination module 210 computes probability distribution of locations over the annotations. In one embodiment, the probability distribution is a multinomial probability distribution. Further, in various embodiments, the probability distribution may be further smoothed by using smoothing module 212. Smoothing module 212 incorporates various smoothing techniques such as, without limitation, annotation based smoothing with neighbors, cell based smoothing, spatial ambiguity aware smoothing. In one embodiment, the probability distributions of locations obtained after the smoothing are stored in data store 214. Thus, language models of locations are developed by geo tag engine 112 by utilizing the annotations and associated location metadata.

At step 408, probability determination module 210 stores the determined probability in the data store 214 of language model 202. The geotag engine 112 may further utilize the determined probabilities of the locations from the data store, to associate one or more locations with a given set of annotations.

Figure 5:
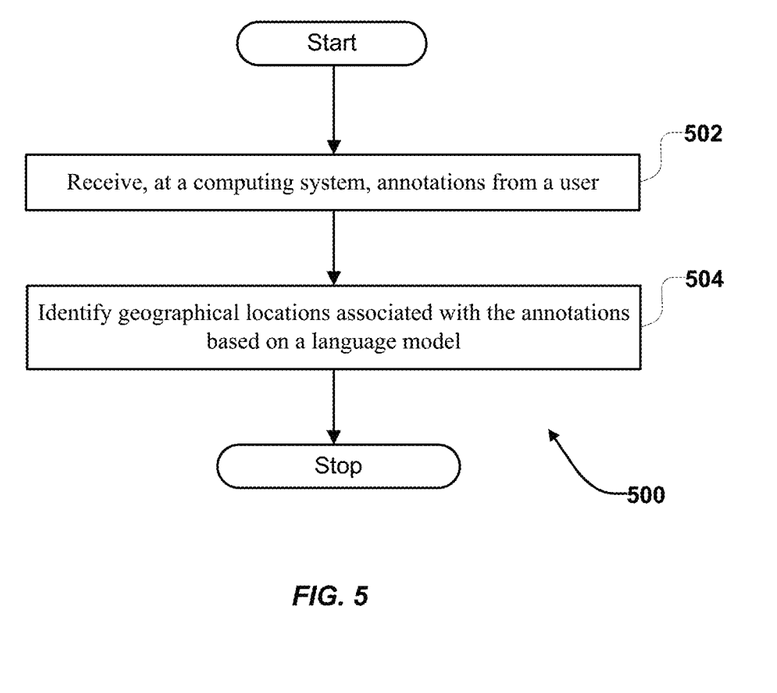
FIG. 5 is a flowchart illustrating an example method for associating one or more geographical locations with a given set of annotations.

FIG. 5 illustrates flowchart 500 summarizing various steps involved in an example embodiment of the invention. At step 502, annotation receiver 204 receives one or more annotations from a user. In one embodiment, received annotations are associated with content uploaded by the user. The content uploaded by the user includes, without limitation, multimedia content, visual content, audio content, text content. Further, annotations may take the form of one or more tags for the content. Other types of annotations include, e.g., a title, a description, creator, and comments. In another embodiment, annotations may be received as a part of the keywords included in a query. The query may be focused to search for geographical locations associated with the annotations.

At step 504, computing unit 206 identifies one or more geographical locations associated with the one or more annotations. In an embodiment, computing unit 206 communicates with the language model 202 to obtain a probability distribution of locations over the annotations. In an embodiment, the probability distribution of locations over the annotations is obtained from data store 214, which is a part of language model 202. In one embodiment, the probability distribution of locations is a multinomial probability distribution. In various embodiments of the present invention, smoothing of the probability distribution of locations may be incorporated in language model 202. In one embodiment, the one or more identified geographical locations are ranked based on the calculated probability distribution.

Figure 6:
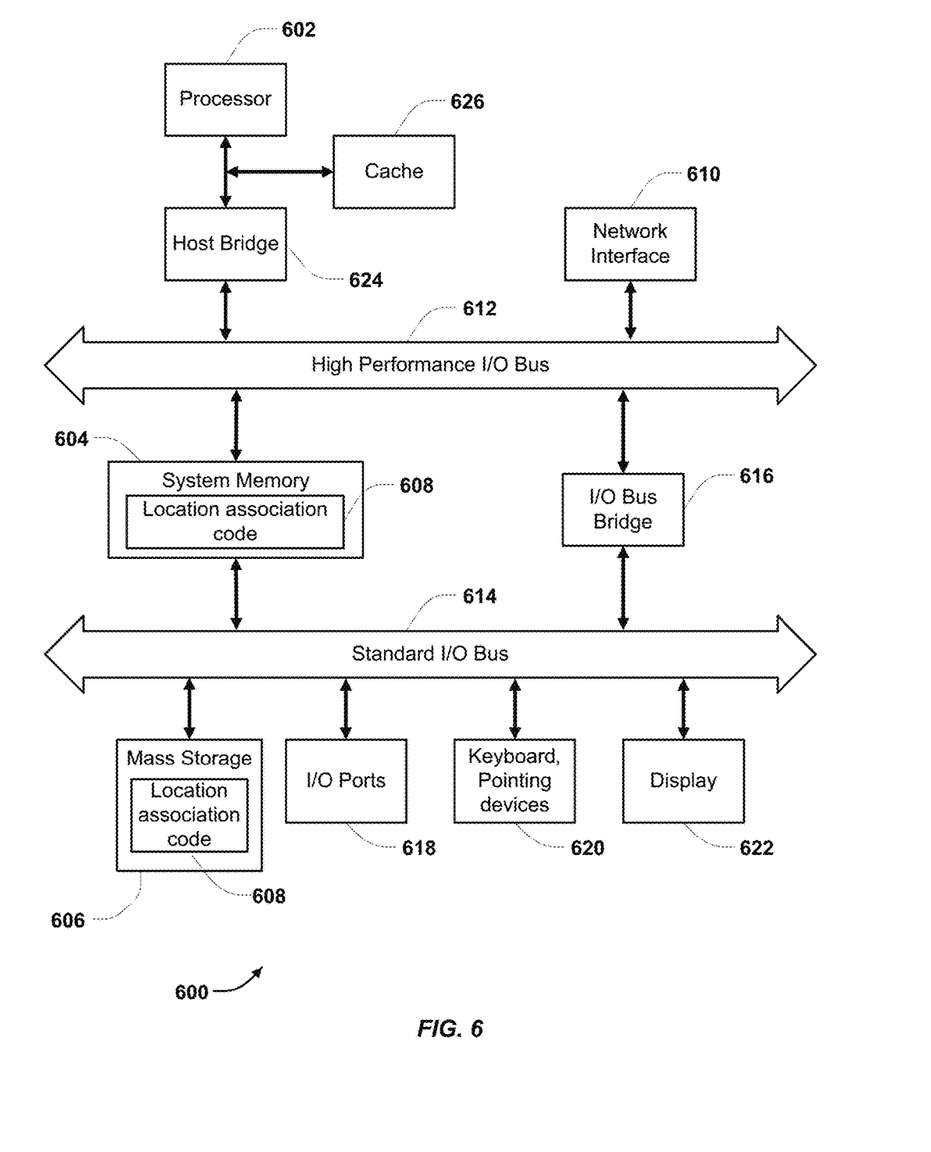
FIG. 6 is a schematic diagram illustrating an example computing system for associating one or more geographical locations with a given set of annotations.

FIG. 6 illustrates an example hardware system 600 to implement the location association system according to one embodiment. Hardware system 600 includes at least one processor 602, a system memory 604, and mass storage 606. The system memory 604 has stored therein one or more application software, programming instructions for implementing location association process 608, an operating system and drivers directed to the functions described herein. Mass storage 606 provides permanent storage for the data and programming instructions for location association process 608, whereas system memory 604 (e.g., DRAM) provides temporary storage for the data and programming instructions when executed by processor 602. The process flow of the programming instructions for location association process 608 is described in detail in conjunction with FIG. 5. In one embodiment, database 110 (shown in the FIG. 1) may reside in mass storage 606. A network/communication interface 610 provides communication between hardware system 600 and any of a wide range of networks, such as an Ethernet (e.g., IEEE 802.3) network, etc. Additionally, hardware system 600 includes a high performance input/output (I/O) bus 612 and a standard I/O bus 614. System memory 604 and network/communication interface 610 couple to bus 612. Mass storage 606 couple to bus 614. I/O Bus Bridge 616 couples the two buses 612 and 614 to each other.

In one embodiment, location association process 608 described herein is implemented as a series of software routines run by hardware system 600. These software routines comprise a plurality or series of instructions to be executed by a processor in a hardware system, such as processor 602. Initially, the series of instructions are stored on a storage device, such as mass storage 606. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 610. The instructions are copied from the storage device, such as mass storage 606, into system memory 604 and then accessed and executed by processor 602.

In one embodiment, hardware system 600 may also include I/O ports 618, a keyboard and pointing device 620, a display 622 coupled to bus 612. I/O ports 618 are one or more serial and/or parallel communication ports that provide communication between additional peripheral devices, which may be coupled to hardware system 600. A host bridge 624 couples processor 602 to high performance I/O bus 612. Hardware system 600 may further include video memory (not shown) and a display device coupled to the video memory. Collectively, these elements are intended to represent a broad category of computer hardware systems, including without limitation general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 600 may include a variety of system architectures; and various components of the hardware system 600 may be rearranged. For example, cache 626 may be on-chip with processor 602. Alternatively, cache 626 and processor 602 may be packed together as a "processor module," with processor 602 being referred to as the "processor core." Furthermore, certain embodiments of the present invention may not require nor include all of the above components. For example, the peripheral devices shown coupled to standard I/O bus 612 may couple to high performance I/O bus 612. In addition, in some embodiments only a single bus may exist with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
accessing, using one or more computing systems, one or more geographical locations and one or more first annotations for one or more items of content, wherein the one or more first annotations comprise at least one designated tag;
determining a probability distribution of one or more geographical locations over the one or more first annotations;
smoothing the probability distribution based, at least in part, on annotation-specific smoothing with the one or more items of content based, at least in part on a smoothing coefficient, wherein the smoothing coefficient for a particular annotation is proportional to a spatial ambiguity of the annotation;
storing the smoothed probability distribution in a language model data store; and
associating the one or more first annotations with one or more cells of a map having a cell grid layout indicating corresponding geographical locations based, at least in part, on the smoothed probability distribution;
wherein at least partially in response to receiving one or more second annotations, determining one or more of the geographical locations corresponding to the one or more second annotations based, at least in part, on the smoothed probability distribution.

2. The method of claim 1, wherein the one or more geographical locations comprise latitude and longitude coordinates of the at least one geographical location.

3. The method of claim 1, wherein the probability distribution comprises a multinomial probability distribution.

4. The method of claim 1, wherein the smoothing of the probability distribution is based, at least in part, on the annotation-based smoothing with neighboring locations within a predefined distance of one another.

5. The method of claim 1, further comprising smoothing the probability distribution based, at least in part, on cell based smoothing with neighboring, locations within a predefined distance of one another.

6. The method of claim 1, further comprising boosting the one or more first annotations based, at least in part, on an external knowledge base of locations.

7. The method of claim 1, wherein the one or more first or second annotations include at least one of: a tag, a title, a description, or a comment.

8. The method of claim 1, wherein the one or more items of content include at least one of: a multimedia content, a visual content, an audio content, or a text content.

9. A method comprising:
receiving, at a computing system, an item of content from a user, the item of content comprising one or more first annotations, wherein the one or more first annotations comprise at least one designated tag;
identifying a probability distribution of the one or more first annotations over two or more geographic locations based, at least in part, on a language model;
smoothing the probability distribution based, at least in part, on annotation-specific smoothing with the item of content based, at least in part on a smoothing coefficient, wherein the smoothing coefficient for a particular annotation is proportional to a spatial ambiguity of the annotation;
receiving one or more second annotations; and
wherein in response to receiving the one or more second annotations, determining one or more of the geographical locations corresponding to the one or more second annotations based, at least in part, on the smoothed probability distribution.

10. The method of claim 9, wherein the probability distribution of locations over the one or more first annotations comprises a multinomial probability distribution.

11. The method of claim 9, further comprising ranking the two or more geographical locations.

12. The method of claim 9, wherein the one or more first or second annotations include at least one of: a tag, a title, a description, a keyword of a query, or a comment.

13. The method of claim 9, wherein the one or more first or second annotations are associated with at least one of: a multimedia content, a visual content, an audio content, or a text content.

14. The method of claim 9, wherein the smoothing the probability distribution is further based, at least in part, on cell based smoothing with neighbors, wherein locations within a specific distance of one another are considered as neighbors.

15. The method of claim 9, further comprising boosting the one or more first or second annotations based, at least in part, on an external knowledge base of locations.

16. A system comprising:
at least one processor;
a memory; and
computer program code stored in a non-transitory computer readable storage medium, wherein the computer program code is executable by the at least one processor to:
access, using one or more computing systems, one or more geographical locations and one or more first annotations for one or more items of content, wherein the one or more first annotations are to comprise at least one tag to be designated;
determine a probability distribution of one or more geographical locations over the one or more first annotations;
smooth the probability distribution to be based, at least in part, on annotation-specific smoothing with the one or more items of content to be based, at least in part on a smoothing coefficient, wherein the smoothing coefficient for a particular annotation is to be proportional to a spatial ambiguity of the annotation;
store the smoothed probability distribution in a language model data store; and
associate the one or more first annotations with one or more cells of a map to have a cell grid layout to correspond to geographical locations to be based, at least in part, on the smoothed probability distribution;
wherein at least partially in response to receipt of one or more second annotations, to determine one or more of the geographical locations to correspond to the one or more second annotations to be based, at least in part, on the smoothed probability distribution.

17. The system of claim 16, the one or more first or second annotations to include at least one of a tag, a title, a description, or a comment.

18. The system of claim 16, the one or more items of content to include at least one of a multimedia content, a visual content, an audio content, or a text content.

19. A system comprising:
at least one processor;

a memory; and computer program code stored in a non-transitory computer readable storage medium, wherein the computer program code is executable by the at least one processor to:
- process an item of content from a user, the item of content to comprise one or more first annotations, wherein the one or more first annotations are to comprise at least one tag to be designated;
- identify a probability distribution of the one or more first annotations over two or more geographic locations to be based, at least in part, on a language model;
- smoothing the probability distribution to be based, at least in part, on annotation-specific smoothing with the item of content to be based, at least in part on a smoothing coefficient, wherein the smoothing coefficient for a particular annotation is to be proportional to a spatial ambiguity of the annotation;
- process one or more second annotations to be received; and
- wherein in response to receipt of the one or more second annotations, determine one or more of the geographical locations to correspond to the one or more second annotations to be based, at least in part, on the smoothed probability distribution.

20. The system of claim 19, the one or more first or second annotations to include at least one of a tag, a title, a description, a keyword of a query, or a comment.

21. The system of claim 19, the one or more annotations are to be associated with the one or more items of content, the one or more items of content to include at least one of a multimedia content, a visual content, an audio content, or a text content.

22. A non-transitory computer readable storage medium storing thereon computer-readable instructions, the computer-readable instructions being executable by one or more processors to:
- access, using one or more computing systems, one or more geographical locations and one or more first annotations for one or more items of content, wherein the one or more first annotations comprise at least one designated tag;
- determine a probability distribution of one or more geographical locations over the one or more first annotations;
- smooth the probability distribution to be based, at least in part, on annotation-specific smoothing with the one or more items of content to be based, at least in part on a smoothing coefficient, wherein the smoothing coefficient for a particular annotation is to be proportional to a spatial ambiguity of the annotation;
- store the smoothed probability distribution in a language model data store; and
- associate the one or more first annotations with one or more cells of a map to have a cell grid layout to indicate corresponding geographical locations to be based, at least in part, on the smoothed probability distribution;
- wherein at least partially in response to receipt of one or more second annotations, determine one or more of the geographical locations to correspond to the one or more second annotations to be based, at least in part, on the smoothed probability distribution.

23. A non-transitory computer readable storage medium storing thereon computer-readable instructions, the computer-readable instructions being executable by one or more processors to:
- process an item of content from a user, the item of content to comprise one or more first annotations, wherein the one or more first annotations are to comprise at least one tag to be designated;
- identify a probability distribution of the one or more first annotations over two or more geographic locations, to be based, at least in part, on a language model;
- smooth the probability distribution to be based, at least in part, on annotation-specific smoothing with the item of content to be based, at least in part on a smoothing coefficient, wherein the smoothing coefficient for a particular annotation is to be proportional to a spatial ambiguity of the annotation;
- process one or more second annotations to be received; and
- wherein in response to receipt of the one or more second annotations, to determine one or more of the geographical locations to correspond to the one or more second annotations to be based, at least in part, on the smoothed probability distribution.

* * * * *